(12) United States Patent
Cloutier et al.

(10) Patent No.: US 7,898,456 B2
(45) Date of Patent: Mar. 1, 2011

(54) APPARATUS AND METHOD FOR DETECTING AND LOCATING HIDDEN OBJECTS

(75) Inventors: Paul A. Cloutier, Nassau Bay, TX (US); Delbert R. Oehme, Kingwood, TX (US)

(73) Assignee: Prairielands Energy Marketing Inc., Bismark, ND (US)

( * ) Notice: Subject to any disclaimer, the term of this patent is extended or adjusted under 35 U.S.C. 154(b) by 184 days.

(21) Appl. No.: 12/388,672

(22) Filed: Feb. 19, 2009

(65) Prior Publication Data

US 2009/0212990 A1 Aug. 27, 2009

Related U.S. Application Data

(60) Provisional application No. 61/064,139, filed on Feb. 19, 2008.

(51) Int. Cl.
*G01S 13/04* (2006.01)
(52) U.S. Cl. ............................ 342/22; 342/27; 342/127; 342/146
(58) Field of Classification Search ................... 342/22, 342/27, 126, 127, 133, 139, 146–147, 156; 324/233
See application file for complete search history.

(56) References Cited

U.S. PATENT DOCUMENTS

| | | | |
|---|---|---|---|
| 4,085,360 A | 4/1978 | Howell | |
| 4,639,674 A | 1/1987 | Rippingale | |
| 5,137,355 A * | 8/1992 | Barbour et al. | ............. 356/342 |
| 5,194,812 A * | 3/1993 | Yokoi | ......................... 324/326 |
| 5,357,253 A * | 10/1994 | Van Etten et al. | ............. 342/22 |
| 5,471,143 A | 11/1995 | Doany | |
| 5,592,170 A * | 1/1997 | Price et al. | ..................... 342/22 |
| 5,773,971 A | 6/1998 | Tavernetti | |
| 6,097,189 A | 8/2000 | Arndt et al. | |
| 6,501,414 B2 | 12/2002 | Arndt et al. | |
| 6,525,539 B2 | 2/2003 | Birken et al. | |
| 6,600,441 B2 * | 7/2003 | Liedtke et al. | ................ 342/22 |
| 6,636,042 B1 * | 10/2003 | Dorren | ....................... 324/326 |
| 6,741,201 B1 * | 5/2004 | De Jongth et al. | ............. 342/22 |
| 6,982,666 B2 * | 1/2006 | Temes et al. | .................. 342/22 |

(Continued)

OTHER PUBLICATIONS

Mikhnev, Valeri; Maksimovitchl, Yelena; Vainikainen, Pertti; , "Microwave Reconstruction of Underground Targets Using Frequency Domain Measurements," Microwave Conference, 2000. 30th European , vol., No., pp. 1-4, Oct. 2000.*

(Continued)

*Primary Examiner* — John B Sotomayor
(74) *Attorney, Agent, or Firm* — Miles & Stockbridge P.C.

(57) ABSTRACT

An apparatus and method for detecting and locating hidden objects employs a symmetrical array of five directional antennas, including a central transmit antenna and a pair of receive antennas at each side of the transmit antenna, respectively. All of the antennas are pointed in the same general direction toward an object field of interest. The transmit antenna radiates a beam of high-frequency electromagnetic energy, and the receive antennas receive high-frequency electromagnetic energy returned by hidden objects. Each pair of receive antennas has an associated phase detector, the output of which represents the phase difference between receive antenna signals corresponding to the received electromagnetic energy. A circuit determines when the outputs of the phase detectors represent predetermined phase differences and operates indicator devices.

12 Claims, 7 Drawing Sheets

U.S. PATENT DOCUMENTS

| | | | |
|---|---|---|---|
| 7,034,740 B2 * | 4/2006 | Witten ........................ | 342/22 |
| 7,312,742 B2 * | 12/2007 | Steinway et al. .............. | 342/22 |
| 2003/0184300 A1 | 10/2003 | Bigelow | |
| 2008/0198063 A1 * | 8/2008 | Cloutier et al. ............... | 342/27 |
| 2008/0278154 A1 * | 11/2008 | Krapf et al. ................. | 324/233 |
| 2009/0237092 A1 * | 9/2009 | Zoughi et al. ............... | 324/637 |

OTHER PUBLICATIONS

"Two-dimensional detection of underground contamination and buried objects using cross-well radar", Proceedings of the SPIE—The International Society for Optical Engineering, May 5, 2006, vol. 6210, p. 62100R-1-11, Serrano et al.*

* cited by examiner

APPARATUS AND METHOD FOR DETECTING AND LOCATING HIDDEN OBJECTS

CROSS-REFERENCE TO RELATED APPLICATION

This application claims the benefit of provisional Application 61/064,139 filed Feb. 19, 2008, incorporated herein by reference.

BACKGROUND OF THE INVENTION

This invention is concerned with an apparatus and method for detecting and locating hidden objects, such as underground cables, pipes, etc., including objects made of plastic, metal, or concrete, for example. Prior apparatus and methods for detecting and locating hidden objects have various disadvantages, including complexity, high cost, inadequate resolution, and difficulty or inability to detect non-metal objects.

BRIEF DESCRIPTION OF THE INVENTION

The present invention provides a simple apparatus and method for detecting and locating a wide variety of hidden or buried objects, including objects made of plastic, metal, or concrete for example. The invention provides a reliable technique for detecting and locating buried elongated objects such as cables or pipes, for example, whether conducting or non-conducting. It uses a symmetrical balanced array of five directional antennas, including a central transmit antenna and a pair of receive antennas at each side of the transmit antenna, respectively, all of which have radiation patterns pointing in the same general direction. In a preferred embodiment, the transmit antenna transmits a beam of high-frequency electromagnetic energy, some of which is returned to the receive antennas from objects to be detected. The invention relies upon phase shift relations in the pairs of receive antennas to determine when an object has been detected. Predetermined phase differences produce outputs that operate associated indicator devices. In the preferred embodiment, equal phase differences, in particular, are indicated.

BRIEF DESCRIPTION OF THE DRAWINGS

The invention will be further described in conjunction with the accompanying drawings, which illustrate preferred (best mode) embodiments, and wherein.

DESCRIPTION OF PREFERRED EMBODIMENTS

Figure 1:
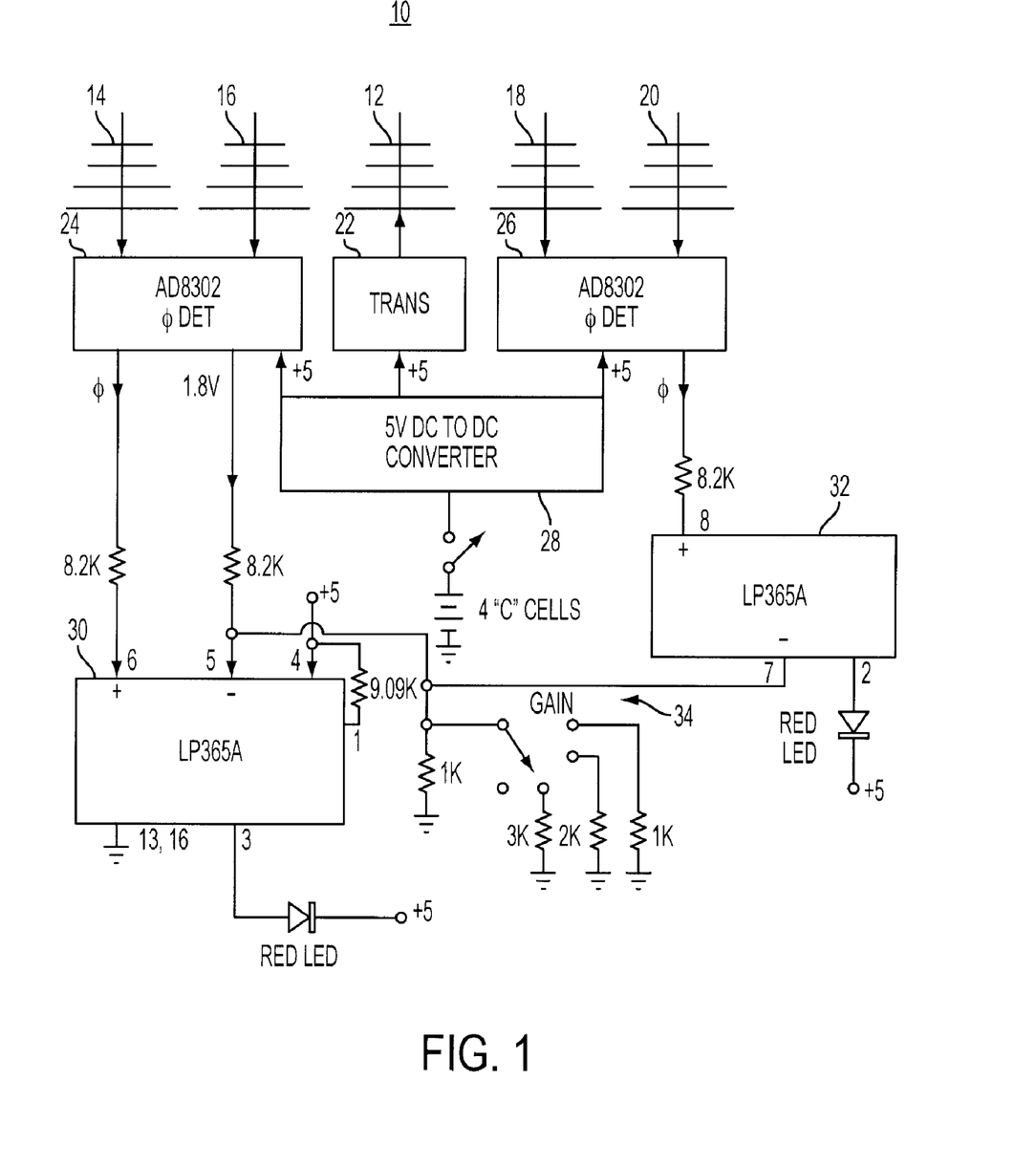
FIG. 1 is a simplified schematic diagram of apparatus in accordance with the invention.
Figure 6:
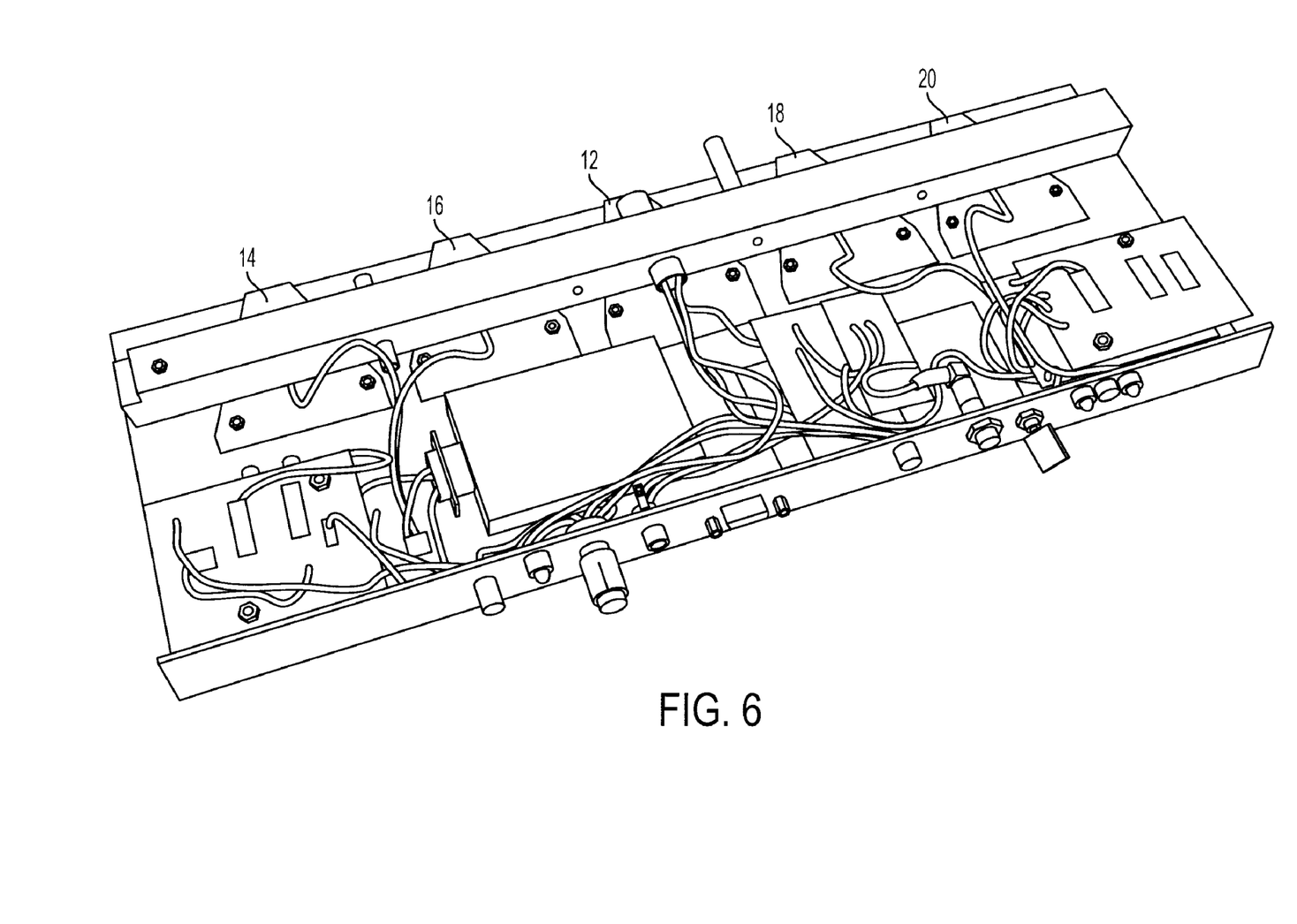
FIG. 6 is a view showing the interior of the locator of FIG. 5.
Figure 7:
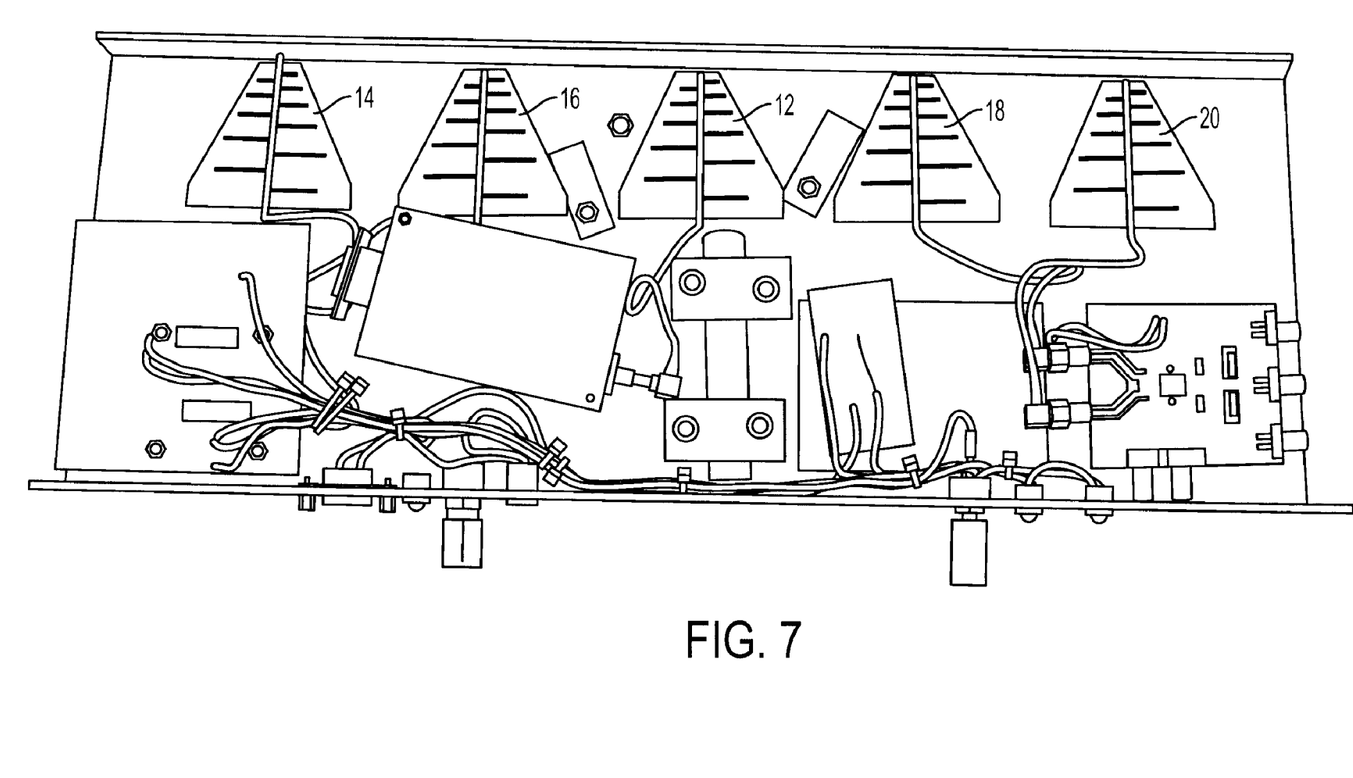
FIG. 7 is a view showing a breadboard version of a locator of the invention.

As shown in FIG. 1, the invention utilizes a symmetrical balanced array 10 of five directional antennas with their radiation patterns pointing in a same axial direction. Physical embodiments of the antennas are shown in FIGS. 6 and 7. Each antenna may be a simple Yagi type embedded, for convenience, in plastic, for example. Of the five antennas of the array, the central antenna is a transmit antenna 12, at each side of which there is a pair of receive antennas 14, 16 and 18, 20, respectively. All of the antennas are arranged in a common plane.

A transmitter 22 supplies a high-frequency signal to the transmit antenna, preferably a continuous wave microwave signal, for example a 2.4 GHz signal, which drives the transmit antenna to transmit a beam of high-frequency electromagnetic energy along the axis of the transmit antenna toward an object field of interest. Objects to be detected in the object field return part of that energy by reflection, to the pairs of receive antennas.

The receive antennas are placed so that each pair of receive antennas will normally have the same predetermined phase difference between the outer receive antenna of the pair and the inner receive antenna of the pair when the apparatus is set up initially with no reflections present. Each phase difference is detected by a phase detector 24, 26, such as an Analog Device AD 8302 phase detector.

In the embodiment shown in FIG. 1, the apparatus is provided with operating power derived from a 5-volt DC to DC converter 28 energized by a series of four "C" cell batteries. In the embodiment shown in FIG. 1, voltage of 1.8 volts divided down to a 0.2 volt reference voltage is obtained from one of the phase detectors and is supplied to two phase comparators 30, 32, such as an LP365A. Each phase comparator also receives a phase signal output from an associated phase detector, which is compared to the 0.2 volt reference. Each phase comparator operates an associated indicator device, such as a RED LED.

In the embodiment, the 0.2 volt output of each phase detector when no reflection is present represents about 150 degrees of phase difference, but the choice of this particular amount of phase difference is not essential. Both pairs of receive antennas should be set equally for balance. This can be accomplished by moving the outside receive antennas in a horizontal direction with respect to their inside partners with no reflections present. It can also be accomplished by using stainless steel screws between the antennas.

The embodiment shown in FIG. 1 also has a "gain" control 34, namely a switch with several resistors connected to different switch terminals and to ground. Various gain settings can be used depending upon the type of objects to be detected. For example, high gain (sensitivity) may not be required when a buried metal pipe is to be detected.

In the embodiment shown in FIG. 1, the setup may be such that a RED LED is lit when a phase signal output from an associated phase detector drops down to less than 0.2 volt. Both RED LED's are lit when both phase detector outputs are less than 0.2 volt.

Figure 5:
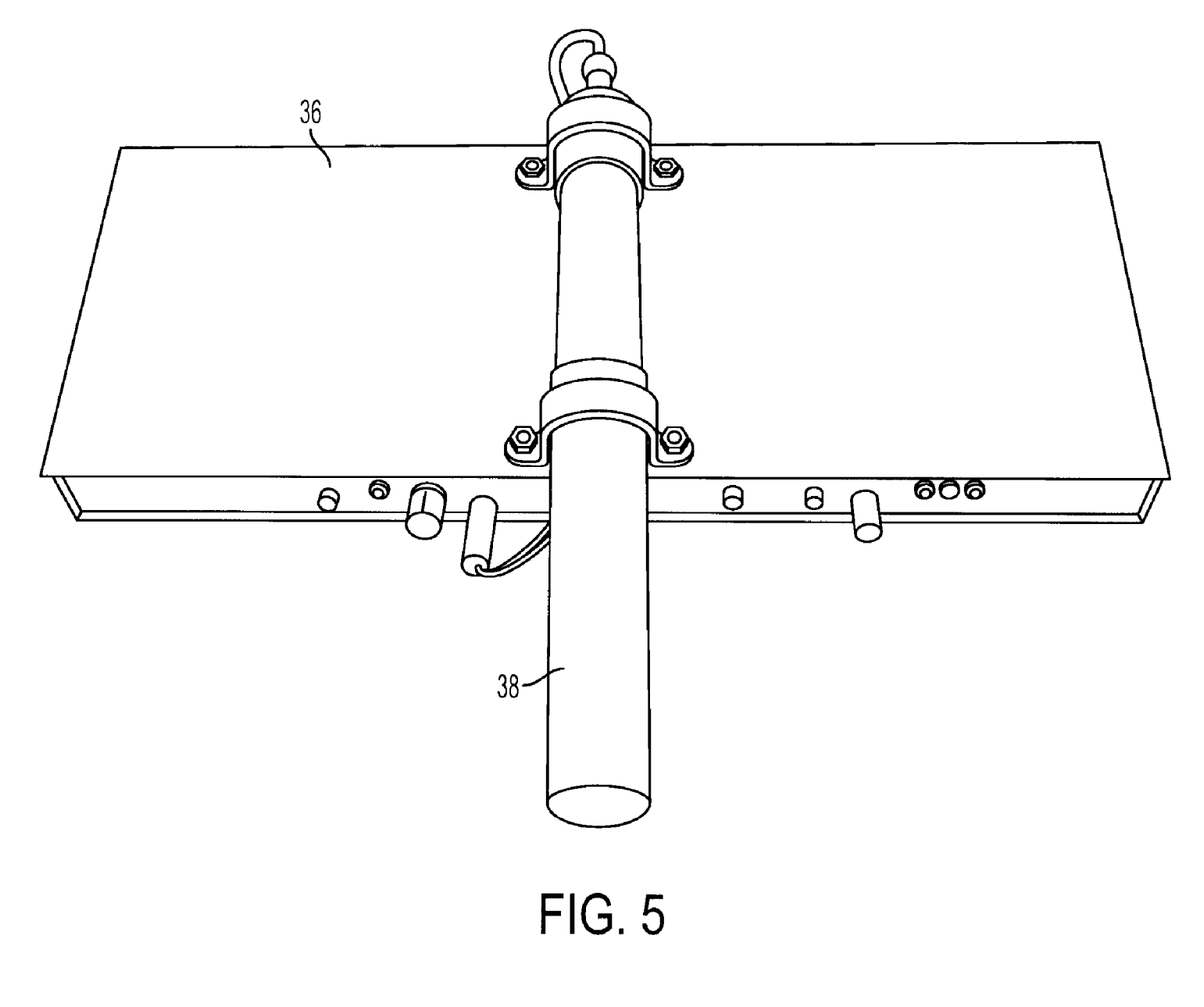
FIG. 5 is a perspective view showing the exterior of a locator in accordance with the invention.

In a mobile embodiment of the invention, the apparatus shown in FIG. 1 may be housed in a case 36 as shown in FIG. 5. The case may be hand-held by a handle 38 having a portion projecting behind the case to be grasped in the hand of a user. The handle may be hollow and used to contain the batteries that supply DC power for the apparatus.

In the use of the apparatus of the invention, an operator, holding the apparatus by means of the handle, may walk toward an object field of interest with the case held so as that the antennas tilt somewhat downwardly toward the object field. In a "scan" of the object field, the operator may be seeking to detect and locate a cable or pipe, for example. The walk toward such a target may be accompanied by individual illumination of the LED's, when various objects are detected, but it is not until both LED's are illuminated at the same time that a desired cable or pipe is located. This occurs when the beam axis of the transmit antenna is substantially perpendicular to the cable or pipe, so that the front edge of the case of the apparatus is substantially parallel to the cable or pipe.

When this occurs, in the embodiment, each phase detector output will have reached 0.2 volt, representing the phase difference between signals corresponding to the electromagnetic energy received by the associated pair of receive antennas, and both LED's will be lit. The gain control may be used to require that both phase detector outputs reach a voltage level of less than 0.2 volt before the associated LED will be lit.

The detection of a pipe of cable, with the transmit antenna beam axis perpendicular thereto, can be verified if the operator steps side-wise left or right and looks for the same phase difference output signals.

With the microwave radiation used in the preferred embodiment, the measured phase difference can vary rapidly with slight movements of the apparatus. The output of each phase detector is a very sharp "peak" condition, and any change in phase difference between associated receive antennas will move the phase detector output away from the 0.2 volt level, and the associated LED will go out.

Figure 2:
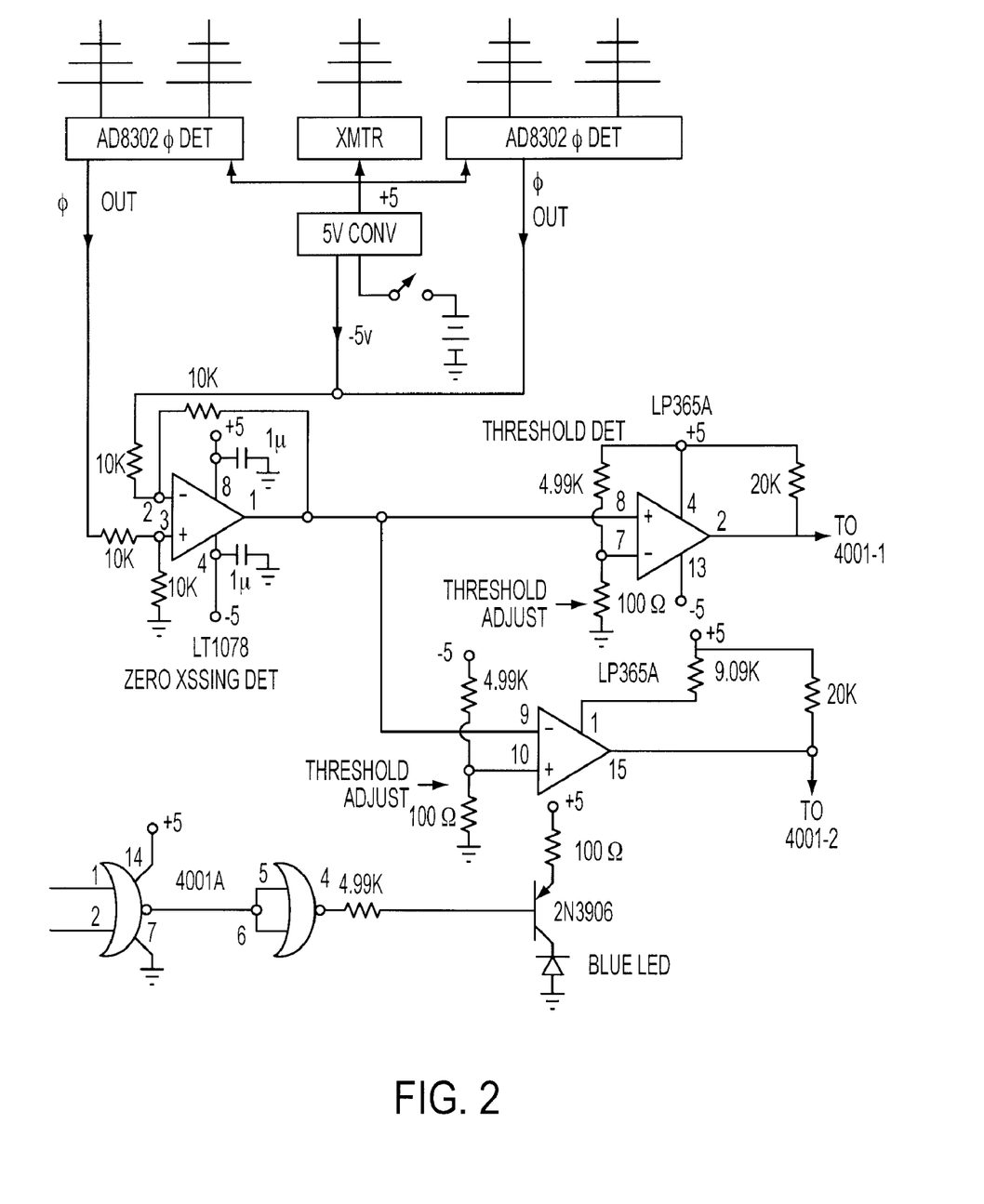
FIG. 2 is a schematic diagram of a modification of the apparatus shown in FIG. 1.
Figure 4:
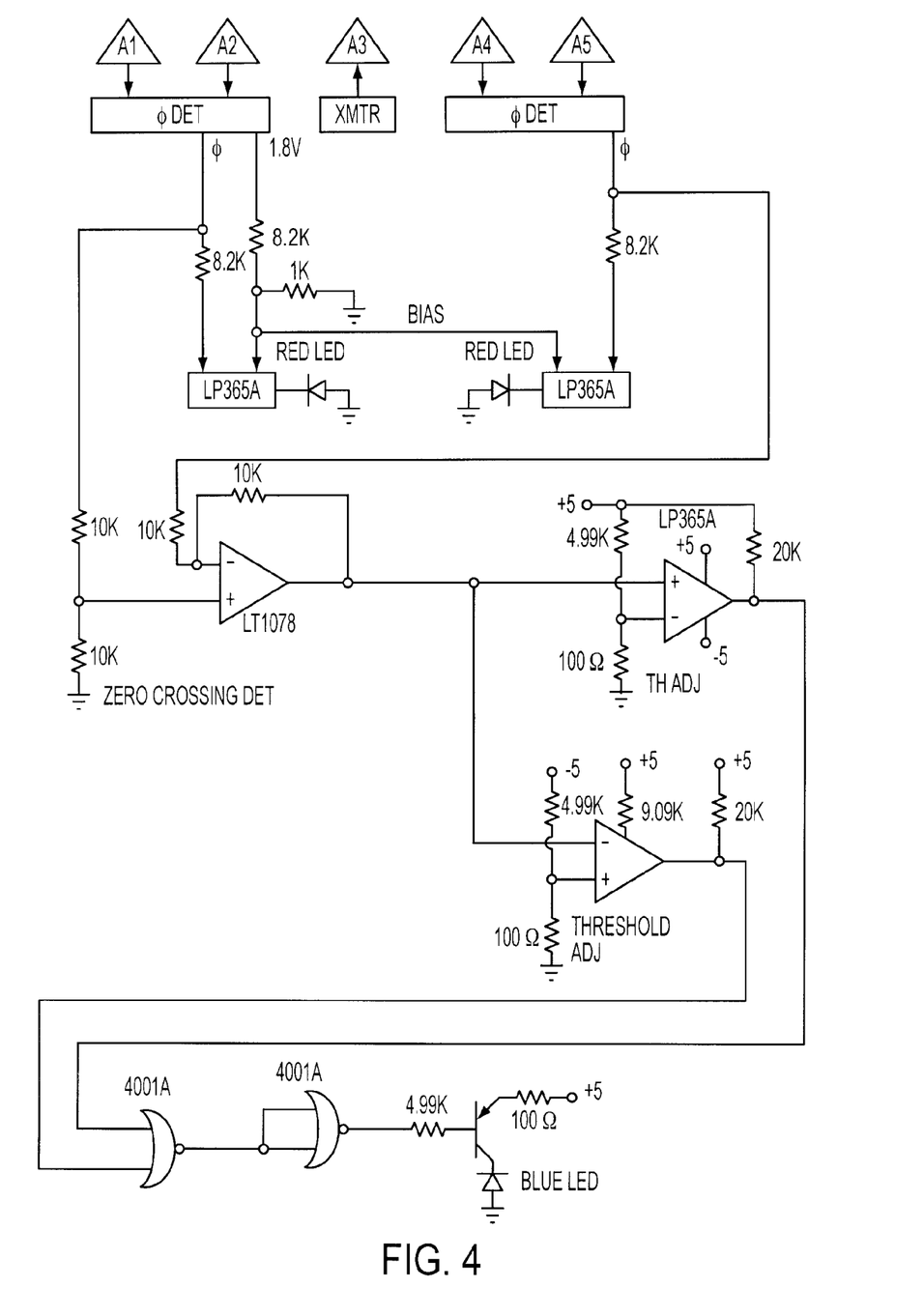
FIG. 4 is a simplified schematic diagram of the modification.

FIGS. 2 and 4 illustrate an embodiment of the invention in which a third indicator device, e.g., a BLUE LED, will be lit whenever the phase detector outputs are substantially the same. As shown, this embodiment employs a zero-crossing detector to which the phase detector outputs are applied, and the output of which is applied to two threshold detectors, concurrent outputs of which are used to illuminate the BLUE LED. An audio indication can be provided using a buzzer, for example, which can be used together with or instead of a visual indication.

Figure 3:
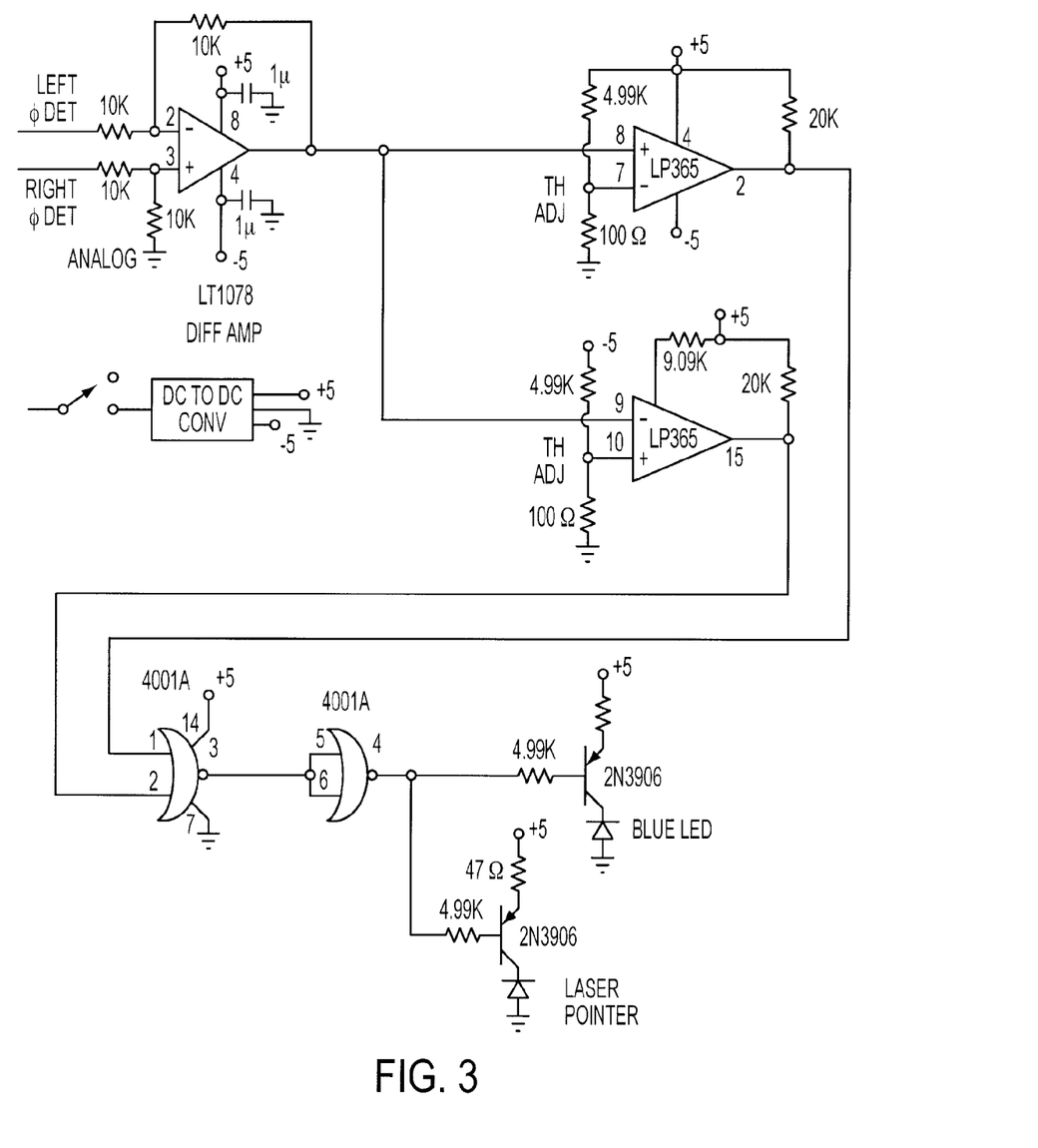
FIG. 3 is a schematic diagram showing further details of the modification.

In the embodiment of FIG. 3, a laser pointer has been added. Whenever the BLUE LED is lit, the laser pointer will be energized to project a beam of laser light from the front of the apparatus to a surface point in the object field below which an object, e.g., cable or pipe, is detected.

In the illustrative apparatus shown in FIG. 6, the complete unit is about 16 inches wide, by about 6 inches in length, by about 1.25 inches thick.

When a below-ground location of a pipe or cable, for example, is detected, the operator may move to a position above that location and may tilt the case of the apparatus further downwardly to a vertical or almost vertical position and move the apparatus forwardly or backwardly to confirm the existence of the pipe or cable by observing maintenance of the initial indication.

In its hand-held version, the invention is designed to detect and locate underground objects in an object field, such as cable, pipeline, ordnance, concrete and bones, for example, including objects made of PVC, plastic, metal and rebar, for example. It will even locate any of these objects buried under concrete or blacktop. One advantage of this version of the invention is that the transmitter is part of a hand-held unit, and the system is not affected by other transmitters like Bluetooth, WI-FI, and others in its frequency range.

While preferred embodiments of the invention have been shown and described, these embodiments are merely illustrative, and modifications can be made without departing from the principles and spirit of the invention, the scope of which is defined in the accompanying claims. For example, the embodiments which have been described use a phase equality "window" of less than 0.2 volt. In a modification, the LED's could be turned on merely when the phase detector outputs are substantially equal within some tolerance "window".

What is claimed is:

1. Apparatus for detecting and locating hidden objects, comprising:
   a symmetrical array of five directional antennas arranged along a common plane with radiation patterns pointing in a same general direction, including a central transmit antenna and a pair of receive antennas at each side of the transmit antenna;
   a transmitter that supplies a high-frequency signal to the transmit antenna, whereby the transmit antenna radiates a beam of high-frequency electromagnetic energy, and whereby the pairs of receive antennas receive electromagnetic energy returned by hidden objects;
   a phase detector associated with each pair of receive antennas, respectively, for detecting electrical phase differences between receive antenna signals corresponding to the electromagnetic energy received by the associated receive antennas and producing an output dependent upon detected phase differences; and
   a circuit that determines when the outputs of the phase detectors represent predetermined phase differences and that operates indicator means.

2. The apparatus of claim 1, wherein the circuit includes a pair of comparators, each of which compares an output from an associated phase detector with a reference and operates an associated indicator device of the indicator means, and wherein each indicator device is activated when the output of the associated phase detector represents a predetermined amount of phase difference.

3. The apparatus of claim 1, further comprising a circuit that indicates that the phase differences are substantially the same.

4. The apparatus of claim 1, wherein the apparatus is a mobile apparatus.

5. The apparatus of claim 1, wherein the high-frequency electromagnetic energy is continuous wave RF.

6. The apparatus of claim 1, wherein the high-frequency electromagnetic energy is in the microwave spectrum.

7. A method of detecting and locating hidden objects that comprises:
   providing a symmetrical array of five directional antennas arranged along a common plane with radiation patterns pointing in a same general direction, including a central transmit antenna and a pair of receive antennas at each side of the transmit antenna, respectively;
   transmitting a beam of high-frequency electromagnetic energy from the transmit antenna;
   receiving at the pairs of receive antennas electromagnetic energy returned by hidden objects;
   detecting phase differences between electrical signals corresponding to the electromagnetic energy received by the receive antennas of each pair and producing corresponding outputs; and
   determining when the outputs represent predetermined amounts of phase difference and producing an indication.

8. A method of claim 7, further comprising determining when the outputs represent substantially equal amounts of phase difference and producing an indication.

9. The method of claim 7, wherein the high-frequency electromagnetic energy is continuous wave RF radiation.

10. The method of claim 7, wherein the high-frequency electromagnetic energy is in the microwave spectrum.

11. The method of claim 7, wherein the array of antennas is moved over an object field to detect and locate underground objects.

12. The method of claim 11, wherein a laser beam illuminates a point in the object field when a predetermined indication is produced.

* * * * *